Aug. 7, 1956   L. D. HAGENBOOK   2,757,950
BUMPER
Filed Aug. 29, 1952   2 Sheets-Sheet 1
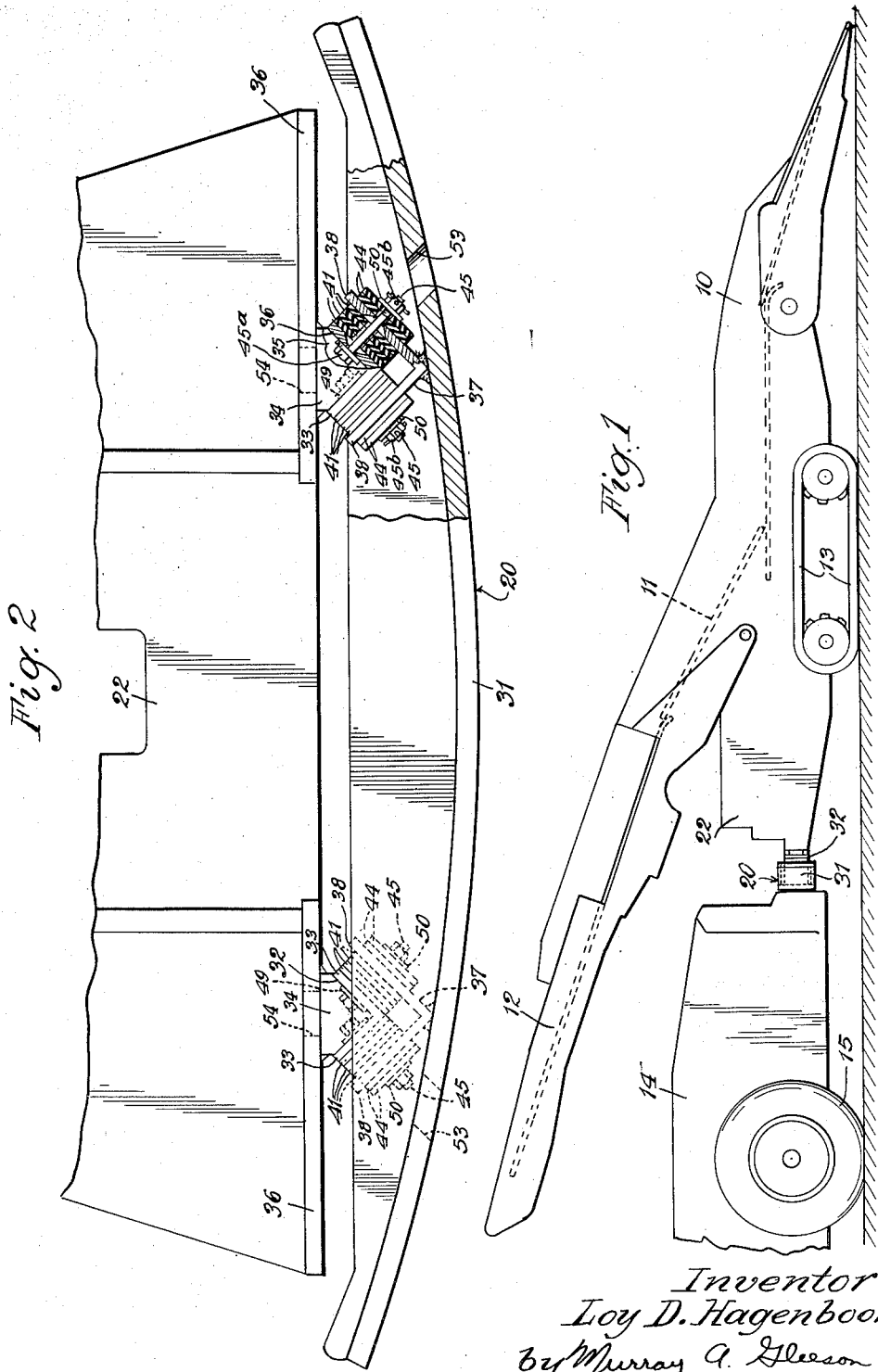
Inventor
Loy D. Hagenbook
by Murray A. Gleeson
Attorney Aug. 7, 1956   L. D. HAGENBOOK   2,757,950
BUMPER
Filed Aug. 29, 1952   2 Sheets-Sheet 2
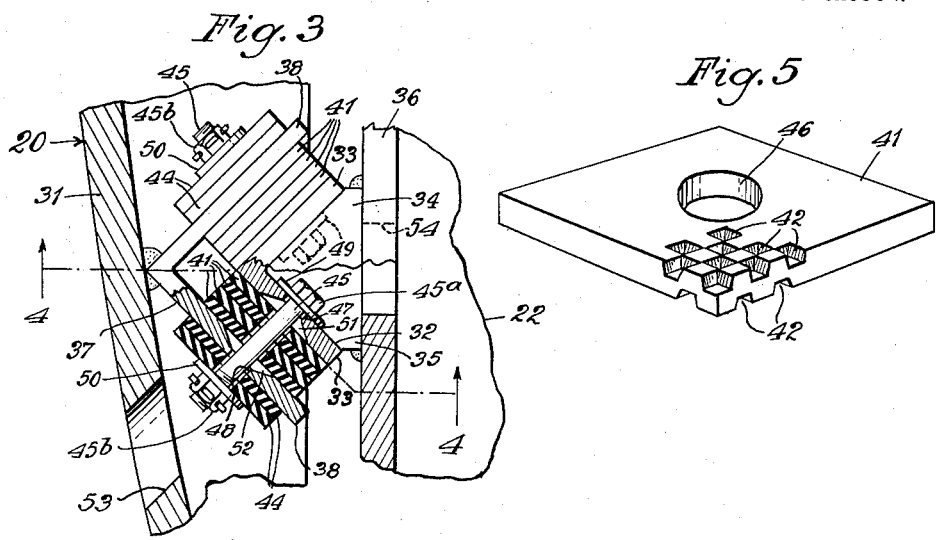
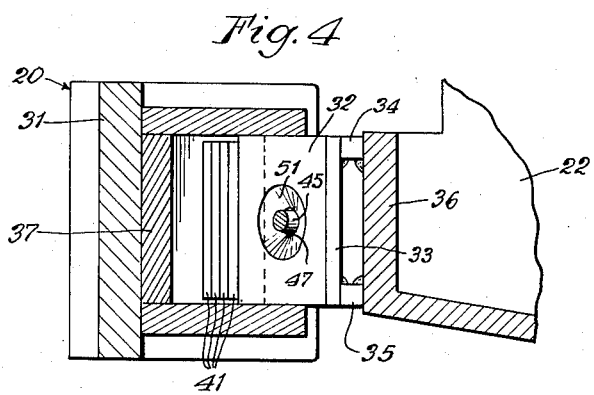
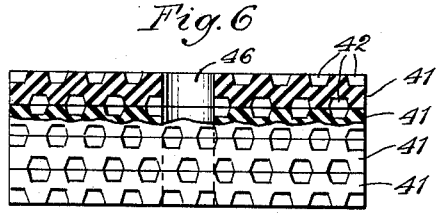
Inventor
Loy D. Hagenbook
By Murray A. Gleeson
Attorney

United States Patent Office 2,757,950
Patented Aug. 7, 1956

2,757,950

BUMPER

Loy D. Hagenbook, Chicago, Ill., assignor to Goodman Manufacturing Company, Chicago, Ill., a corporation of Illinois Application August 29, 1952, Serial No. 307,013

2 Claims. (Cl. 293—88)

This invention relates to improvements in heavy-duty shock absorbing bumpers especially adapted for use on loading machines used in mines, but also capable of use generally in the automotive field.

On loading machines and continuous mining machines used in coal mines, a bumper is located at the rear end of the main frame beneath the discharge boom in order to absorb a shock when a coal transfer car, commonly termed a "shuttle car," overruns and rams into the main frame of the machine. The blows are heavy and repeated and, as the size of shuttle cars and loading machines has increased, it has been necessary to increase the size of the bumpers until bumpers of conventional form appear to be getting out of hand. In order to reduce the weight of the bumper bar and provide means for absorbing the shock with the maximum efficiency, I have developed an improved form of bumper using a relatively light bumper plate mounted on a novel form of bumper support including a plurality of rubber pads so disposed that the shock load is taken at least in part in shear of the rubber, regardless of the direction of the blow.

Accordingly, the principal object of the invention is to provide an improved and simplified form of shock absorbing mounting for bumpers especially adapted to absorb heavy shocks applied at varying angles but without requiring excessive weight and thickness of metal in the bumpers or their supports.

A further object of the invention is to provide a novel form of bumper mounting in which shocks are absorbed by rubber plates acting in shear in practically every direction.

The invention may best be understood by reference to the accompanying drawings, in which:

Figure 1 is a side view of a loading and shuttle car showing how the latter may engage the bumper of the loading machine when moved into receiving position below the discharge boom of the machine;

Figure 2 is an enlarged fragmentary detail view of the loading machine shown in Figure 1, having a bumper constructed in accordance with my invention, with parts shown in section;

Figure 3 is an enlarged detail plan view, in part section, of one of the bumper supports;

Figure 4 is a detail section taken on line 4—4 of Figure 3;

Figure 5 is a detail perspective of one of the rubber plates used in the bumper supports;

Figure 6 is a side view, in part section of a stack of rubber plates as assembled for use in a bumper support.

Referring now to details of the embodiment of my invention illustrated in the drawings, a loading machine indicated generally at 10 may be of any conventional type having a suitable material gathering device at its forward end for transferring material upon an elongated central conveyor 11 leading upwardly and over the main frame of the loading machine and, thence, along an overhanging discharge boom 12 at the rear end of the machine. The discharge boom may be arranged as usual for lateral swinging movement to discharge the material at varying angles with respect to the main frame. In the illustrative form of loading machine of Figure 1, the loading machine is mounted on caterpillar treads 13 for travel over the mine floor.

Referring more particularly to the novel form of bumper 20 made in accordance with my invention, the same extends across and projecting from the rear end of the main frame 22 of the loading machine 10, beneath its overhanging discharge boom 12, in position to receive the shocks frequently occurring when the transfer car 14 is being maneuvered into loading position beneath the discharge boom. It will be understood that, to distribute the load evenly along the receiving compartment of the transfer car, it is common practice to shift the transfer car forwardly or rearwardly with respect to the loading machine while the material is being loaded into said car. Through carelessness of operation, the transfer car often overruns and bumps into the rear end of the machine frame. The bumper 20 is provided to absorb the shocks of these bumps.

The bumper 20 includes an elongated generally horizontal bumper plate 31 formed along a wide arc extending the full width and slightly beyond the rear end of main frame 22 of the loading machine. This plate is preferably made of spring metal capable of yielding to a considerable degree under heavy shocks rather than being made of relatively rigid heavy section metal of the kind heretofore employed for bumpers in machines of this kind.

The invention relates primarily to the details of the mountings for the bumper plate 31 which are shown in Figures 2, 3 and 4. Two mountings are employed, each near opposite ends of the bumper plate 31. Each mounting includes a 90-degree V-shaped angle piece 32 made up of side wings 33, 33, and welded to vertically spaced upper and lower horizontal plates 34 and 35 which are, in turn, welded to a transverse frame member 36 forming part of the machine frame 22. A complementary 90-degree V-shaped angle piece 37 made up of side wings 38, 38 welded along its apex to the rear face of the bumper plate 31. The side wings 38, 38 of angle piece 37 are somewhat longer than the corresponding side wings 33, 33 of the first-named angle piece 32.

A plurality of laminated rubber pads 41 are interposed between the corresponding side wings 33 and 38 of the V-pieces on each side of their respective apexes.

Details of the laminated rubber pads are shown in Figures 5 and 6 in which each of said pads is shown as consisting of a plurality of generally rectangular molded rubber plates, each preferably formed with a plurality of recesses 42, 42 on opposite sides thereof, to increase flexibility of shearing movement along the general plane of the pad, as well as to increase the compressibility of the pad in a direction normal to the plane of the pad. In the form shown herein, four pads 41 are interposed between each pair of corresponding side wings 33 and 38. Two additional rubber pads 44 similar to the pads 41 are disposed on the outer sides of the outer side plates 38, 38. Each pad assembly is held together by a bolt 45 passing through central apertures 46 in the rubber pads 41 and 44 and apertures 47 and 48 in the side wings 33 and 38 respectively.

An end washer 49 is interposed between the head 45a of each bolt 45 and the front face of each side wing 33. End washer 50 is interposed between the nut 45b of each bolt 45 and the exposed face of the outermost rubber pad 44.

In the preferred form shown, the inner side wings 33 and 38 are each provided with opposed generally conical expansion chambers 51, 52 surrounding their bolt holes 47 and 48 respectively, and opening toward the adjacent rubber plates 41, so as to facilitate expansion of the rubber pads under shock loads.

The nuts 45b on bolts 45 are normally adjusted to hold the rubber pads under sufficient compression to support the bumper against sagging, but without seriously detracting from freedom of compression of the pads under shock loads.

The bolt holes 47 and 48 in the side wings 33 and 38 are large enough to permit limited universal pivotal movement of the bolts 45 therein to accommodate the assembly to various degrees of tilt of the bumper occurring when the rubber pads 41 and 44 are distorted. Access holes 53, 53 are provided in the bumper plate 31 to facilitate assembly of the bolts and pads extending toward the outer end of the bumper bar where otherwise sufficient room may not be available to assemble said bolts. Another access hole 54 may be provided through adjacent upright portions 36 of the main frame to afford access to the inner ends of the bolts 45 of each mounting.

It will be understood that the term "rubber" as applied to the pads 41 and 44, broadly includes natural or synthetic rubber, or other materials having similar elastic characteristics, and may also include such materials reinforced with fabric but otherwise retaining their essential elastic properties.

With a pair of flexible rubber mountings arranged as above described, blows received by the bumper plate 31 at any direction from the rear of the main frame will be absorbed by the rubber pads 41 and 44, with at least some of the pads always acting either partially or wholly in shear, while others will be acting partially or wholly in compression, depending upon the angle of impact.

I claim:
1. A bumper mounting support for an elongated bumper plate, said support comprising a pair of spaced inner and outer complementary V-shaped pieces each having opposed upright side wings, one of said pieces being rigidly secured to a bumper plate and the other piece being rigidly secured to a vehicle frame, a plurality of rubber pads, means removably securing said pads intermediate the opposed side wings of said pieces, said means including a bolt passing through apertures in said opposed side wings and each pad, said bolt being disposed therethrough with clearance therebetween permitting limited universal tilting movement between the bumper plate and support.

2. The structure defined in claim 1 wherein there is a recessed portion on the inner opposed faces of the side wings surrounding the bolt apertures permitting expansion of the adjacent areas of the rubber pads.

References Cited in the file of this patent

UNITED STATES PATENTS

| | | |
|---|---|---|
| 1,439,209 | Watson | Dec. 19, 1922 |
| 1,822,026 | Guy | Sept. 8, 1931 |
| 2,043,725 | Anderson | June 9, 1936 |
| 2,216,429 | Blomberg | Oct. 1, 1940 |
| 2,445,723 | Brown | July 20, 1948 |